United States Patent [19]

Griffiths et al.

[11] 3,969,767

[45] July 13, 1976

[54] SPACER SUPPORTS FOR FLEXIBLE DISK STRUCTURES

[75] Inventors: Donald E. Griffiths, Longmont, Colo.; Joseph H. Koestner, Hopewell Junction, N.Y.; David G. Norton, Boulder, Colo.

[73] Assignee: International Business Machines Corporation, Armonk, N.Y.

[22] Filed: Apr. 2, 1975

[21] Appl. No.: 564,406

[52] U.S. Cl. .................................. 360/99; 360/98; 360/102
[51] Int. Cl.² ................. G11B 5/016; G11B 17/32; G11B 5/64
[58] Field of Search ................ 360/98, 99, 135, 102

[56] References Cited
UNITED STATES PATENTS
3,846,837  11/1974  Jacques .............................. 360/99

OTHER PUBLICATIONS
"Spaced Flexible Disk File With Central ventilation" Barbeau et al., I.B.M. Tech. Disc. Bull., vol. 17, No. 3, Aug. 1974, p. 814.

"Multiple Magnetic Disk Removable Pack," Herring et al., I.B.M. Tech. Disc. Bull., vol. 17, No. 2, July 1974, p. 503.

*Primary Examiner*—Robert S. Tupper
*Attorney, Agent, or Firm*—Herbert F. Somermeyer

[57] ABSTRACT

Semi-rigid washers are coaxially disposed to form an air-permeable spindle for coaxially supporting flexible record disks. A plurality of such washers and disks is coaxially stacked to construct a flexible disk file. Washers preferably have an annular shoulder with a depth slightly different than the thickness of the record disks for firmly supporting and aligning same in the coaxial stack. Alternatively, disks may be adhesively secured to a radial outward portion of each washer. Additionally, each washer has a plurality of radially extending air passageways for facilitating radial air movement which controls the stack of flexible record disks. A radial inward portion of each washer abuts each adjacent washer for forming a firm axial stack of disks. A rigid stabilizing plate at each axial end completes the assembly.

11 Claims, 12 Drawing Figures

SPACER SUPPORTS FOR FLEXIBLE DISK STRUCTURES

DOCUMENT INCORPORATED BY REFERENCE

The present invention is an improvement over that shown by Penfold et al in commonly assigned, copending, patent application Ser. No. 414,614, now U.S. Pat. No. 3,867,723, filed Nov. 7, 1973, and entitled "Multiple Flexible Disk File".

BACKGROUND OF THE INVENTION

The present invention relates to magnetic record disk storage files and in particular to those disk files employing a stack of a multiplicity of coaxial flexible record disks.

In addition to the structure shown in the document incorporated by reference, other people have constructed record storage apparatus employing coaxial stacks of flexible record disks such as shown in U.S. Pat. No. 3,838,462 and 3,838,461, among others. As set forth in the document incorporated by reference, it is desirable for stability purposes to have circumferentially uniform, radially outward, air flow between adjacent disks. Accordingly, air passageways must extend from a center supporting rotatable spindle to an interstice between adjacent record disks. Such support should permit rapid and inexpensive assembly of a stack of disks while maintaining precise axial alignment of record members. Preferably, when control indicia are employed with each record disk for identifying it, then not only must the disks be coaxial, but must also be circumferentially aligned. Both attributes should be achieved at low cost.

SUMMARY OF THE INVENTION

In accordance with the invention, disk spacers provide both radial outward circumferentially uniform air flow while controlling clamping force on record disks supported by such spacers and acting as a central support spindle.

A spacer constructed in accordance with the present invention has an annular ring with an inner diameter for establishing with other washers, an axially elongated air passageway and a radial outward portion for receiving a record disk. The radial outward portion may have a shoulder with a depth slightly less than the record disk such that, when adjacent washers are clamped together, the disk is slightly compressed for providing a secure and stable attachment of the record disks to the spindle. When the record disks are respectively adhesively secured to the washer shoulders, the total thickness of the disk plus adhesive is slightly greater than the shoulder axial depth. The disk may also be adhesively secured to a radially extending surface having no shoulder.

Each washer has a set of axially extending, circumferentially, spaced-apart projections creating radially extending air passages for air to flow from the central air passageway radially outwardly between adjacent record disks supported by the spacers. A radial inward portion of the spacers abuts each adjacent spacer for absorbing and controlling the clamping force on the supported record disks, as well as forming a laminated tubular spindle. In certain embodiments, projections creating the radial air passages also abut the next adjacent washer.

In accordance with various aspects of the invention, a radial grooving and shoulder configuration can be implemented using various geometric choices.

The foregoing and other objects, features, and advantages of the invention will be apparent from the following more particular description of the preferred embodiment, as illustrated in the accompanying drawing.

THE DRAWING

DETAILED DESCRIPTION

Figure 1:
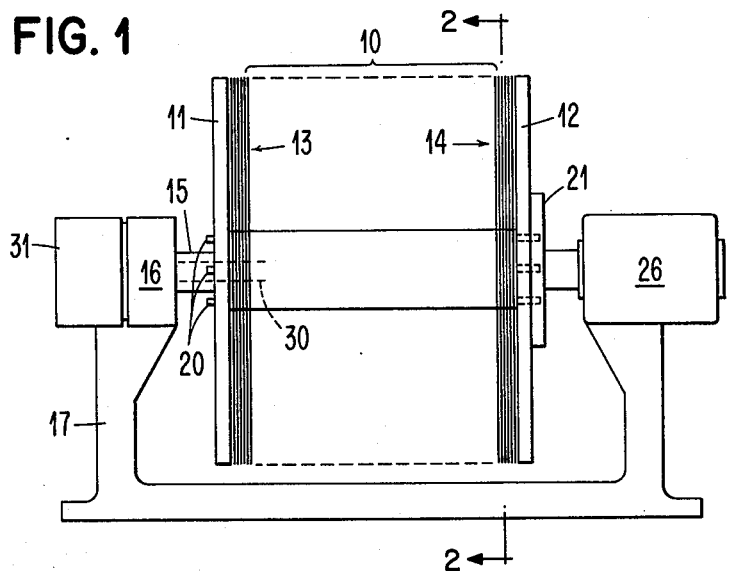
FIG. 1 is a diagrammatic side elevational showing of a record storage apparatus employing the present invention.

Referring now more particularly to the drawing, like numerals indicate like parts and structural features in the various diagrammatic views. A coaxial stack of commonly supported record disks 10 is separated from a pair of axially opposite stabilizing and rigid end plates 11 and 12 by a plurality of stack access buffering disks 13 and 14. The entire assembly is mounted for rotation at one end on tubular support shaft 15 journaled at one end in end block 16 and at the opposite end on a drive shaft of electric motor 26. End plate 12 has circular boss 21 for connection to motor 26. Shaft 15 may be welded to end plate 11. The stack of disks 10, 13, 14 and end plates 11 and 12 are axially clamped by three bolts 20 (bolts may be threaded, may be rivets, or other equivalent fasteners or may be replaced by an adhesive between the washer-spacers) extending from plate 11 through all disks (as later described) and threaded into end plate 12. Motor 26 and end block 16 rest on machine frame 17.

Support shaft 15 is tubular with coaxial air passageway 30, which is in fluid communication with air supply 31 via a rotating seal (not shown) in end block 16. Disks 10 have a polyester substrate and a magnetic oxide coating.

Access to a record surface of the record disk can be in accordance with the teaching in the document incorporated by reference, or any other technique for axially separating record disks for permitting radial movement of a transducer (not shown) into an axially enlarged interstice between two adjacent flexible record disks. The buffer disks 13 and 14 allow the record disks adjacent the buffer disks to be axially moved toward the rigid end plates 11 and 12; i.e., access to a surface of the buffer disks 13 and 14 may be prevented by the axial end plates 11 and 12.

Figure 3A:
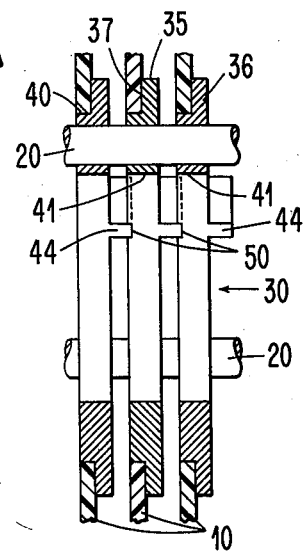
FIGS. 3A–3E are diagrammatic partial sectional views taken along lines 3A–3A to 3E–3E of FIGS. 2A–2E, respectively, in the direction of the respective arrows for showing the clamping feature and the radial air passageway feature of the present invention.

Each record disk is supported by its own individual spacer or washer, such as spacers 35 and 36 (FIG. 3A). Each spacer supporting a flexible disk, including buffer disks 13 and 14, has an annular shoulder 37 at the radial outer extremity on one axial surface portion of the washer. The shoulder, as at 40, has an axial depth slightly less than the thickness of the flexible disks 10, 13, or 14 being supported. For example, a flexible record disk 10 may have an axial thickness of 65 micrometers; while the shoulder axial length 40 may be 60 micrometers providing for a compression of 5 micrometers. Selection of these dimensions depends upon the desired compression for the disks to yield a proper clamping which does not result in perturbations of the disk surface (caused by overclamping) or wrinkling by underclamping (centrifugal force moving the disks away from the shoulder). For added security, disks may be adhesively secured to surfaces 37 and 40 of each of the respective spacers 35 and 36. Serrations on surface 37 may provide additional retaining forces.

Radial inward portions 41 of spacers 35 and 36 have a maximum axial thickness such that portions 41 abut the adjacent spacers as best seen in FIG. 3A. Such contact by the adjacent spacers controls the clamping force on disks 10 and provides for a rigid solidifying clamping force in the entire stack assembly. Bolts 20 hold all washers 35, 36, etc., firmly together as an axially laminated tubular shaft extending between rigid end plates 11 and 12. The axial air passage 30 extends through end plate 11 from shaft 15 into the stack assembly. Air from source 31 then permeates the stack as set forth in Penfold et al, supra, and as later described.

Radial outward air flow from axial air passage 30 is provided by a plurality of radial air passageways 43 in each of the spacers which are separated by a like number of radially extending, clampenhancing, axially extending projections 44. In the FIGS. 2A and 3A embodiment, projections 44 are ridges extending radially outward from the radial inward sections 41 to the outermost radial extremity of each of the spacers. In this manner, contact between the ridges 44 and adjacent disks 10 completes clamping action between two abutting spacers 35 and 36.

Figure 2A:
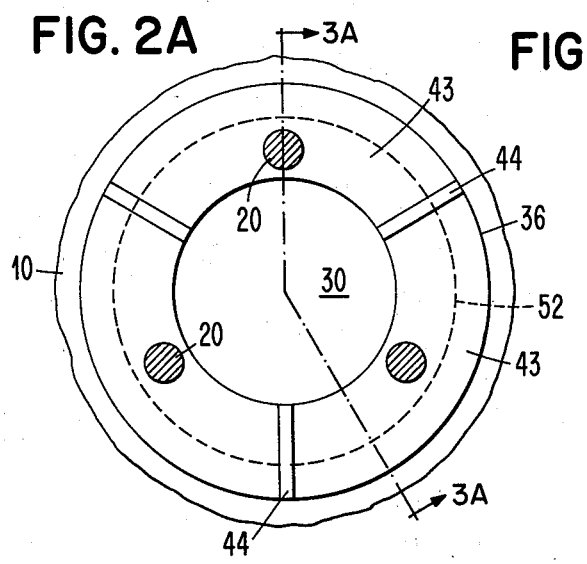
FIGS. 2A–2E are diagrammatic partial sectional views taken in the direction of the arrows along line 2—2 of FIG. 1 for showing the relationship of a record disk and a disk supporting washer for various washer configurations.

The frictional forces between adjacent washers 35 and 36 resulting from bolt 20 clamping action are sufficient in many applications to secure disks 10 against relative rotation or radial creep. For best results, disks 10 are adhesively secured to the described washer-spacers. The washer-spacer shown in FIGS. 2A and 3A is best made by chemical milling techniques from brass, stainless steel, copper beryllium, or other materials of similar strength and resiliency. Plastic-type materials can also be used. Circumferential alignment of washers or spacers may be provided by aligning the projections 44 and mating detents 50 as best seen in FIG. 3A and as located in FIG. 2A.

Figure 2B:
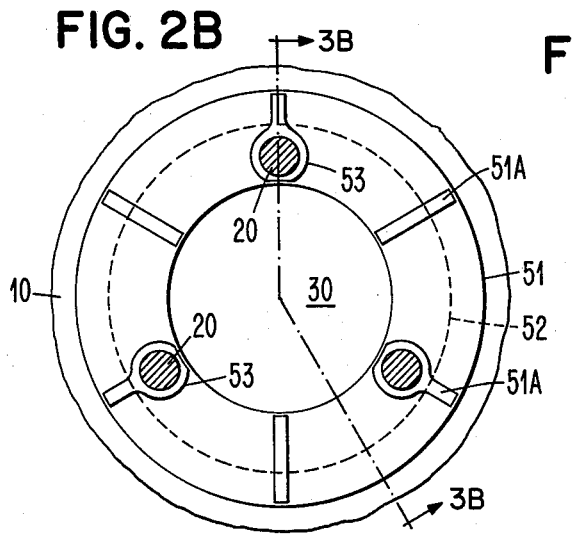
Figure 3B:
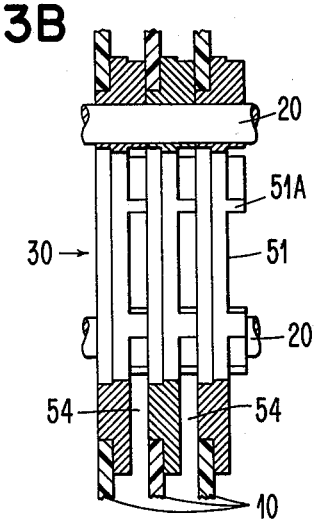

Referring next to FIGS. 2B and 3B, a second embodiment of the invention is described. The annular washer 51, when stacked as described with respect to the FIGS. 2A and 3A embodiment, also forms axially elongated central air passageway 30 for distribution of air pursuant to Penfold et al, supra. The annular shoulder extends completely around the washer as at 52 on which disks 10 are adhesively secured. A plurality of axially extending projections 51A provide the firm spacing of radial inward portion 41 of FIG. 3A. Projections 51A are uniformly spaced around the washer and include forming a boss 53 around each of the bolts 20. In this embodiment, contact between adjacent washers is continuous between projections 51A and an adjacent washer throughout the radial extent of each washer. Because of the configuration of projections 51A, disks 10 are not continuously urged against adjacent washers such as seen at circumferential interstice 54 of FIG. 3B. This interstice is an air passageway from axial chamber 30 to the interstices between adjacent disks 10. Instead of bosses 53 being formed around bolts 20, such bolts may be rectangularly shaped and inserted in radially inwardly opening slots (not shown) instead of the bosses 53.

Figure 2C:
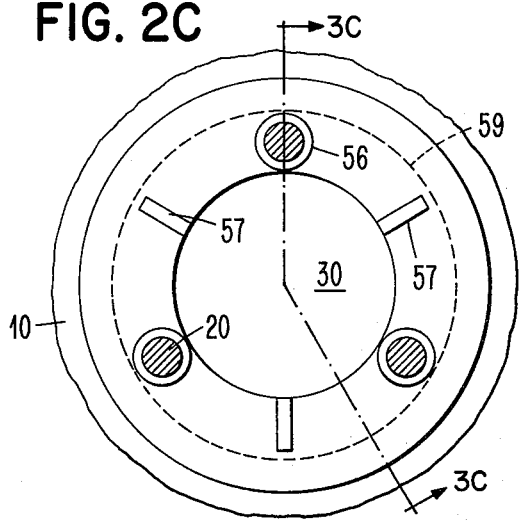
Figure 3C:
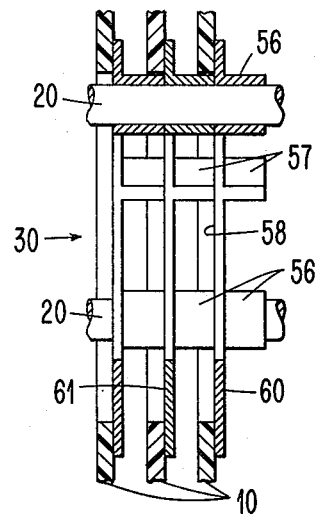

A third embodiment of the invention is shown in FIGS. 2C and 3C wherein the axial spacing projections between adjacent washers are noncontinuous. These axial projections include three axially extending bosses 56 for receiving bolts 20, respectively, and three stabilizing axial projections 57 disposed intermediate bosses 56. One axial face 58 (FIG. 3C) is completely flat with the disk 10 being placed and adhesively secured to that face along dash line 59. In securing a disk 10 to a washer-spacer, a jig may hold the washer and have a radial outward projection for aligning disks 10 along dotted line 59. Alternatively, a first washer-spacer 60 (FIG. 3C) can be placed with the axial projections 56 and 57 on a flat surface. Three bolts 20 may extend upwardly from the flat surface for aligning the washer. Suitable adhesive is added to surface 58 with a disk 10 being placed thereon. Then, a second washer-spacer 61 is placed over the bolts 20 and slid down until its axial projections 56 and 57 extend inside the central aperture of the disk 10 for radially aligning same on the first washer-spacer 60. In this manner, not only are the washer-spacers a portion of the final product, but are self-jigging. This embodiment provides a maximum cross-sectional air passageway between axial air passage 30 and the interstices between adjacent disks 10.

Figure 2D:
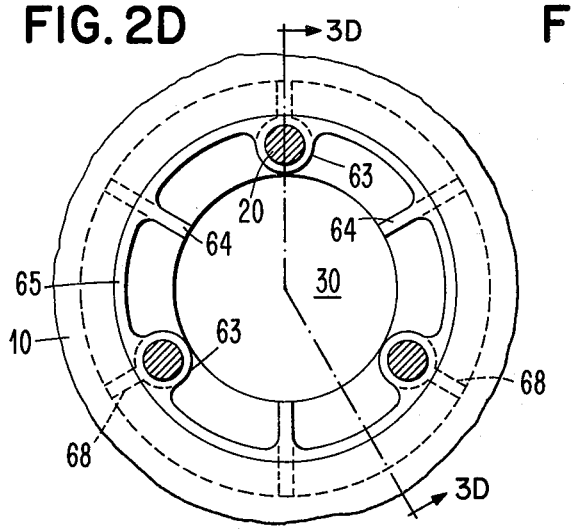
Figure 3D:
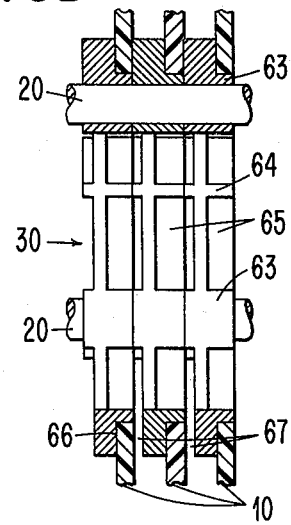

A fourth embodiment is shown in FIGS. 2D and 3D again having three bosses 63 for receiving three bolts 20, respectively. In addition to axially extending, radially oriented projections 64, an annular axial oriented rim 65 defines a radial inward portion of disk 10 receiving shoulder 66. Rib 65 provides additional strength in the washer-spacer. The radial air passageways are best seen in FIG. 3D at 67. Additionally, oppositely axially extending projections 68 ride for a complete contact between axially adjacent washer-spacers.

Figure 2E:
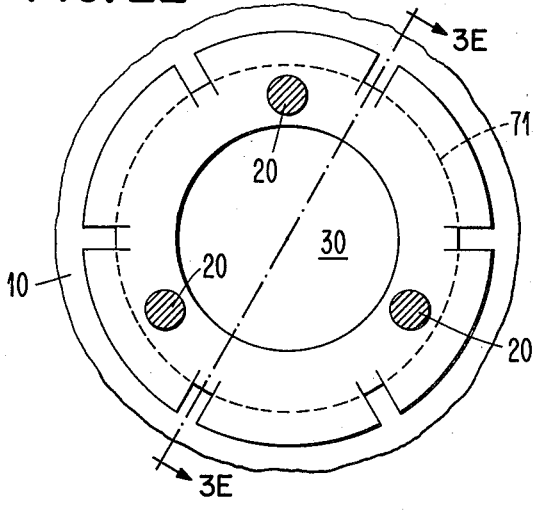
Figure 3E:
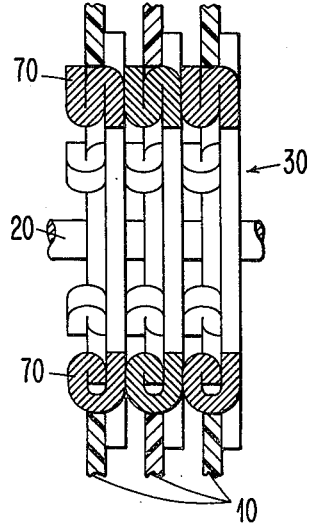

A fifth illustrative embodiment is shown in FIGS. 2E and 3E wherein the washer-spacer can be constructed using punch-forming techniques. Again, three holes in the washer-spacer respectively receive bolts 30. A plurality of tabs are punched from the radial outward portion of the washer-spacer as best seen in FIG. 2E and formed into axial extending projections, as best seen in FIG. 3E. The washer is formed in a one-step punch-forming operation. A disk 10 is simply placed over tabs 70 to abut same (as best seen in FIG. 2) at inner radius 71 of disk 10.

From the above description, it is apparent that various geometric configurations can be practiced using the present invention for achieving the results stated, some of which can be constructed by chemical etching techniques, as shown in FIG. 2A; and some can be constructed using punch press techniques as shown in FIGS. 2E and 3E. In addition, washer-spacers may be constructed of woven material, as will be next described.

Figure 4:
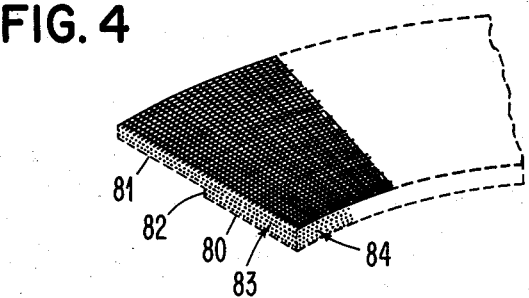
FIG. 4 is a simplified diagrammatic showing of a disk spacer employing woven techniques.

Referring next to FIG. 4, a woven fiber spacer embodiment is shown in diagrammatic form. The woven mesh spacers can be constructed similarly to that described in the document incorporated by reference. However, a radially inward portion 80 has a greater axial thickness than a radial outward portion 81 for forming disk-receiving shoulder 82. This may be accomplished by weaving a greater plurality of circumferentially extending fibers 83 in portion 80 than in portion 81. All of the transversely extending fibers 84 are precisely radially aligned such that maximum radial outward air flow is provided between a center tubular shaft 15 and the interstice between adjacent record disks 10. It is preferred that the washers used in the FIG. 4 illustrated embodiment employ polyester fibers.

Figure 5:
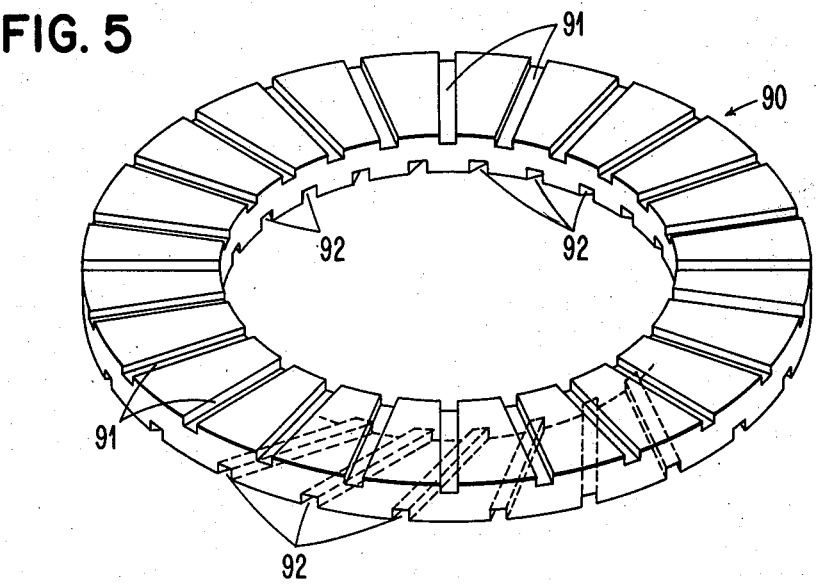
FIG. 5 is a diagrammatic showing of an alternative embodiment of the present invention.

In addition to air passageways 43, on one axial end surface of the spacers, radial air passageways may be provided on both axial surface portions. As shown in FIG. 5, spacer 90 has a first set of radial grooves 91 on one surface and a second set 92 of radial grooves on a second surface. The first and second sets of axial grooves can be divided into primary and secondary sets, the primary sets 91 corresponding to radial grooves 43 of FIG. 3A. The secondary set 92 corresponds to grooves formed in a spacer adjacent the primary grooves 91 of an adjacent spacer, such as in area 93 of FIG. 3A. Air through secondary pasageways or grooves 92 then communicate to the primary grooves 43 of FIG. 3A for providing additional air volume between tubular shaft 15 and any interstice betweeen adjacent record disks.

Grooves 91 and 92 may be straight and displaced at angles with respect to each other; for example, grooves 91 may be on a pure radius, while secondary grooves 92 may strike an angle of about 20° with respect to grooves 91. Additionally, either or both of the grooves may be arcuate for assisting in air movement to the interdisk interstice. The direction of curvature is a function of the direction of rotation such that centrifugal force is used to maximum advantage for achieving pumping action by curving the air passageways.

While the invention has been particularly shown and described with reference to a preferred embodiment thereof, it will be understood by those skilled in the art that various changes in form and detail may be made therein without departing from the spirit and scope of the invention.

What is claimed is:
1. A magnetic storage apparatus comprising:
a laminated tubular spindle consisting of a plurality of coaxially abutting spacer washers mounted for rotation as a unit and including radially extending air passageways, and each of said spacer washers having a radially inward portion of maximum axial extent for abutting engagement with both axially adjacent other ones of said spacer and radial outward portion of lesser axial extent, each washer having a central aperture aligned with apertures from other ones of said washers in said tubular spindle;
a like plurality of flexible record disks mounted to said spacer washers, respectively, in said radially outward portions;
means for rotating said tubular spindle; and
means for supplying fluid to said tubular spindle for fluid movement radially outwardly through said radially extending air passageways.

2. The apparatus set forth in claim 1 wherein each of said spacers consists of woven material with a plurality of fibers, some of said fibers extending substantially circumferentially and others of said fibers extending substantially radially and all of said fibers extending in no other direction.

3. The apparatus set forth in claim 1 wherein each said spacer washers are a unitary member having a central web portion of a given maximum radial extent;
a plurality of equally spaced-apart, radially elongated, axially extending ridges on one axial surface portion of said web portion; and
an annular shoulder on a surface axially opposite said ridges of said web portion being said radial outward portion and for receiving said flexible disks.

4. The apparatus set forth in claim 3 wherein said disks have a greater axial respective thickness than said angular shoulders such that each disk is axially compressed between axially adjacent ones of said spaces and said disks including plastic type substrate.

5. The apparatus set forth in claim 3 wherein:
each of said spacers has a circumferentially orienting detent for circumferentially aligning each and every one of said disk members into a circumferentially aligned, coaxial stack of disks.

6. The apparatus set forth in claim 1 further including in combination:
a plurality of rigid plates for stabilizing rotation of said flexible disks, end ones of said rigid plates being secured to axially extreme ones of said washers, said washers having a plurality of bolt-receiving apertures; and
a plurality of bolts extending between and fastened to said end one rigid plates and extending through respective axially aligned ones of said plurality of said bolt-receiving apertures such that said coaxial washers are under pressure.

7. The apparatus set forth in claim 1 further including in combination:
first and second end rigid plates disposed, respectively, at axial opposite ends of said stack of disks for stabilizing rotation of said flexible disks;
means in said stack securing all of said washer-spacers together and to said end one rigid plates; and
means for mounting said rigid plates for rotation.

8. The magnetic storage apparatus set forth in claim 7 wherein each of said washer-spacers includes a plurality of uniformly, circumferentially, spaced-apart, axially extending projections having a common outer radii;
each of said disks having a central aperture and disposed around said outer radii and having an axial thickness substantially less than the axial length of said axially extending projections; and
means securing said disks to said washer-spacers, respectively.

9. The subject matter set forth in claim 8 further each of said washers including radially, outwardly extending, shoulder means on predetermined ones of said axial spacers and disposed such as to axially compress all of said disks between one washer-spacer and said shoulder on an adjacent one of said washer-spacers.

10. The subject matter set forth in claim 8 wherein each said washer-spacer is a unitary member and said axial extending spacers being folded tabs from an outer radial portion of said washer-spacer, respectively, and being disposed on a radial inward portion of the washer-spacer such that axial compression of the stack is limited by such axial extending spacers.

11. The subject matter set forth in claim 8 wherein each of said washer-spacers includes an axially extending annular rim dividing said inner radial portion from said outer radial portion and said disk abutting circumferentially around said rib.

* * * * *